United States Patent
Kaur et al.

(10) Patent No.: US 10,261,762 B2
(45) Date of Patent: Apr. 16, 2019

(54) USER INTERFACE TEMPLATE GENERATION USING DYNAMIC IN-MEMORY DATABASE TECHNIQUES

(71) Applicant: SAP SE, Walldorf (DE)

(72) Inventors: Bhavneet Kaur, Ludhiana (IN); Prabal Mahanta, Lucknow (IN)

(73) Assignee: SAP SE, Walldorf (DE)

( * ) Notice: Subject to any disclaimer, the term of this patent is extended or adjusted under 35 U.S.C. 154(b) by 373 days.

(21) Appl. No.: 15/238,194

(22) Filed: Aug. 16, 2016

(65) Prior Publication Data

US 2018/0052665 A1 Feb. 22, 2018

(51) Int. Cl.
*G06F 17/00* (2019.01)
*G06F 17/24* (2006.01)
*G06F 3/048* (2013.01)
*G06F 9/44* (2018.01)
*G06F 8/38* (2018.01)
*G06F 9/451* (2018.01)
*G06F 16/95* (2019.01)

(52) U.S. Cl.
CPC .............. *G06F 8/38* (2013.01); *G06F 9/451* (2018.02); *G06F 16/95* (2019.01)

(58) Field of Classification Search
CPC .............. G06F 17/248; G06F 17/3089; G06F 17/2247; G06F 17/30896; G06F 17/30893; G06F 17/30905; G06F 8/36; G06F 8/38; G06F 8/20; G06F 8/70; G06Q 30/02; H04L 67/02
See application file for complete search history.

(56) References Cited

U.S. PATENT DOCUMENTS

| | | | | |
|---|---|---|---|---|
| 8,572,501 | B2* | 10/2013 | Ferry | G06F 3/04817 715/764 |
| 9,134,969 | B2* | 9/2015 | Brandstetter | G06F 8/34 |
| 9,357,018 | B2* | 5/2016 | Fichtenholtz | H04L 67/16 |
| 9,928,043 | B2* | 3/2018 | Bacinschi | G06F 8/36 |
| 2007/0162846 | A1* | 7/2007 | Cave | G06F 17/3089 715/210 |
| 2010/0070916 | A1* | 3/2010 | Lees | G06F 3/0481 715/801 |
| 2012/0102398 | A1* | 4/2012 | Cok | G06T 11/60 715/274 |

(Continued)

OTHER PUBLICATIONS

Aquino et al., Transformation templates: adding flexibility to model-driven engineering of user interfaces, 8 pages (Year: 2010).*

*Primary Examiner* — Thuy Dao
(74) *Attorney, Agent, or Firm* — Jones Day

(57) ABSTRACT

Systems and methods are provided for receiving data and uploading it into an in-memory database using a set of predefined procedures. The data includes a plurality of data records. A plug-in embedded in the in-memory database detects the uploaded data and a structure corresponding to the uploaded data. A user interface (UI) template is created on the detected structure of the uploaded data. From the UI template, a web application is created. By activating the web application, an end-user UI is created which includes a plurality of graphical user interface elements corresponding to the uploaded data. The end-user UI is initiated for rendering in a graphical user interface.

20 Claims, 8 Drawing Sheets

(56) References Cited

U.S. PATENT DOCUMENTS

| | | | |
|---|---|---|---|
| 2014/0013212 A1* | 1/2014 | Von Haden | G06F 17/248 715/243 |
| 2014/0046980 A1* | 2/2014 | Kleinschmidt | G06F 17/30896 707/793 |
| 2014/0258849 A1* | 9/2014 | Chung | G06F 17/212 715/243 |
| 2015/0178263 A1* | 6/2015 | Meschkat | G06F 17/248 715/235 |
| 2017/0147364 A1* | 5/2017 | Shaposhnikov | G06F 17/248 |

\* cited by examiner

USER INTERFACE TEMPLATE GENERATION USING DYNAMIC IN-MEMORY DATABASE TECHNIQUES

TECHNICAL FIELD

The subject matter described herein relates to dynamically generating user interface (UI) templates and web applications using database procedures associated with databases such as an in-memory database. The web applications can be Hyper-Text Markup Language (HTML), HTML5, or Java-script based.

BACKGROUND

As enterprises continue to grow, the need for advanced computing capabilities to assist with various reporting activities is becoming a necessity. Databases are used to maintain and modify large amounts of information to fulfill various enterprise needs. Accessing this information, however, typically requires intimate knowledge of database queries and associated query languages. Growing enterprises continually look for ways to improve operational efficiency. Providing enterprises with advanced capabilities to easily access and modify database information without requiring specialized skills can assist in operational efficiency improvement.

SUMMARY

In one aspect, data is received and uploaded into an in-memory database using a set of predefined procedures. The data includes a plurality of data records. A plug-in embedded in the in-memory database detects the uploaded data and a structure corresponding to the uploaded data. A user interface (UI) template is created on the detected structure of the uploaded data. From the UI template, a web application is created. The web application can be HTML, HTML5, or Java-script based. By activating the web application, an end-user UI is created which includes a plurality of graphical user interface elements corresponding to the uploaded data. The end-user UI is initiated for rendering in a graphical user interface. A layout rule can be triggered by the initiated rendering that scales the end-user UI according to display specifications of the graphical user interface.

In some variations, user interactions can be received by at least one data processor in a graphical user interface. The user interactions can be with a plurality of graphical user interface elements. Unique data points can be identified within the plurality of graphical user interface elements associated with the user interactions. The UI template can be modified based on the user interactions and identified unique data points.

Modifying the UI template can include recording a frequency of user interactions associated with the plurality of graphical user interface elements and corresponding timestamps. The recorded frequency can be provided to an arrangement application to generate an arrangement specification. The plurality of graphical user interface elements can be arranged corresponding to the arrangement specification.

A second web application can be created from the modified UI template. The second web application can be HTML, HTML5, or Java-script based. A second end-user UI can be created by activating the second web application. The second end-user UI can include a second plurality of graphical user interface elements. Rendering of the second end-user UI can be initiated by at least one data processor in a graphical user interface. The arrangement specification can enable horizontal scrolling through the second plurality of elements on the graphical user interface.

In another aspect, a non-transitory computer readable medium contains program instructions. Execution of the program instructions by at least one data processor result in operations that include receiving data comprising a plurality of data records. The data can be uploaded into an in-memory database using a set of predefined procedures. A plug-in embedded in the in-memory database detects the uploaded data and a structure corresponding to the uploaded data. A user interface (UI) template is created on the detected structure of the uploaded data. From the UI template, a web application is created. The web application can be HTML, HTML5, or Java-script based. By activating the web application, an end-user UI is created which includes a plurality of graphical user interface elements corresponding to the uploaded data. The end-user UI is initiated for rendering in a graphical user interface. A layout rule can be triggered by the initiated rendering that scales the end-user UI according to display specifications of the graphical user interface.

In yet another aspect, a system includes at least one data processor and memory storing instructions. Execution of the memory storing instructions by the at least one data processor results in operations for receiving data comprised of a plurality of data records. The data can be uploaded into an in-memory database using a set of predefined procedures. A plug-in embedded in the in-memory database detects the uploaded data and a structure corresponding to the uploaded data. A user interface (UI) template is created on the detected structure of the uploaded data. From the UI template, a web application is created. The web application can be HTML, HTML5, or Java-script based. By activating the web application, an end-user UI is created which includes a plurality of graphical user interface elements corresponding to the uploaded data. The end-user UI is initiated for rendering in a graphical user interface. A layout rule can be triggered by the initiated rendering that scales the end-user UI according to display specifications of the graphical user interface.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. One technical advantage includes providing users with a dynamically responsive UI containing data records and unique data points. The end-user UI can be created by a UI template and corresponding web application. The web application can be HTML, HTML5, or Java-script based. A user can search the information within the data records via the end-user UI. Based on user interactions, the end-user UI can dynamically respond by modifying the UI template and corresponding web application in order to provide tailored data records for the user. The web application can be HTML, HTML5, or Java-script based. Using the created end-user UI, a user does not need to have SQL knowledge in order to view or interact with data records located in an in-memory database.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
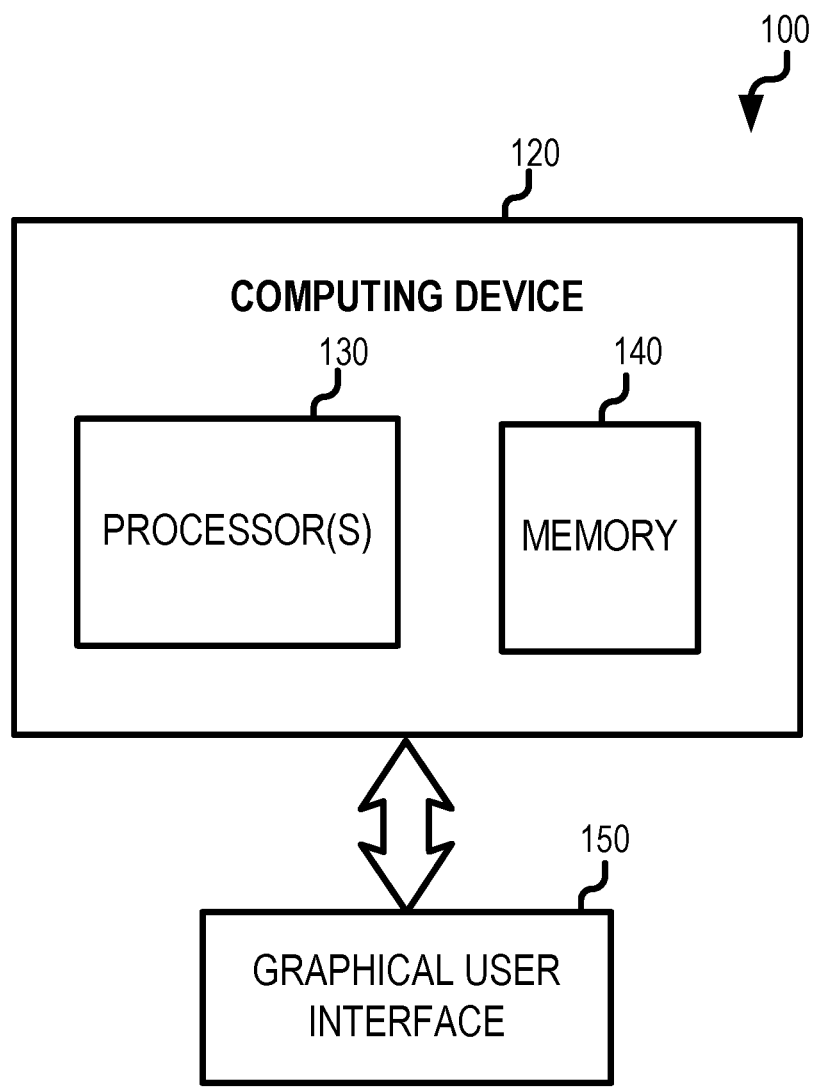
FIG. 1 is a block diagram of an example implementation system for dynamically generating a UI template and web application.

FIG. 1 is a block diagram 100 of an example implementation system for dynamically generating a UI template and web application. The web application can be HTML, HTML5 or Java-script based. The system can include a computing device 120. The computing device 120 can include memory 140 for storing instructions for execution by one or more data processor/processor cores 130. Computing device 120 can interface with graphical user interface 150 to initiate rendering of an end-user UI. Alternatively, graphical user interface 150 can be included in computing device 120. A user can interface with implementation system 100 via graphical user interface 150.

Figure 2:
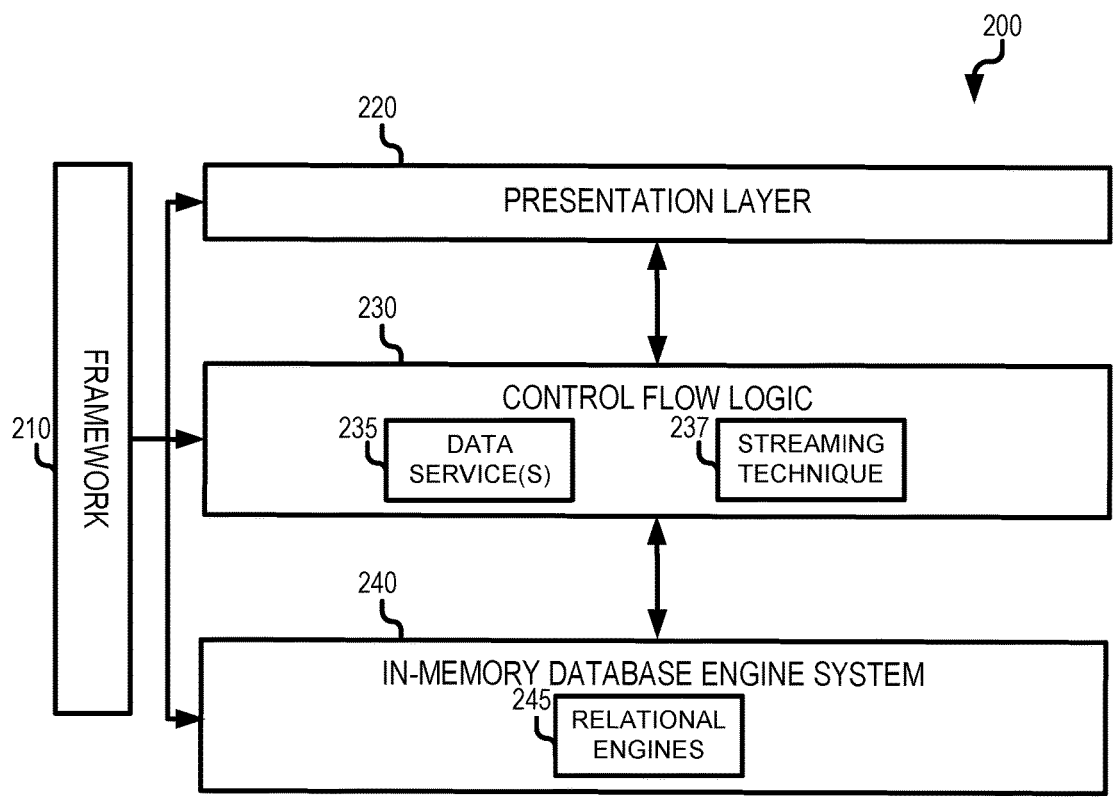
FIG. 2 is a block diagram depicting an example system architecture for dynamically generating a UI template and web application.

FIG. 2 is a block diagram 200 depicting an example system architecture for dynamically generating a UI template and web application. The web application can be HTML, HTML5, or Java-script based. Framework 210 can interact with presentation layer 220 to process uploaded data records. Data service 235, such as an extended application service (XS), can upload the corresponding data to an in-memory database engine system 240, such as the SAP HANA platform. This upload utilizes a set of pre-defined procedures that first analyze the data file and subsequently create a column table within the in-memory database engine system 240. Framework 210 can build rules for analyzing the uploaded data via a control flow logic 230 layer using streaming technique 237. After data analysis of an initial data stream comprising the uploaded data records, framework 210 can interact with relational engines 245 belonging to in-memory data system engine 240 to create a UI template and corresponding HTML application.

Figure 3:
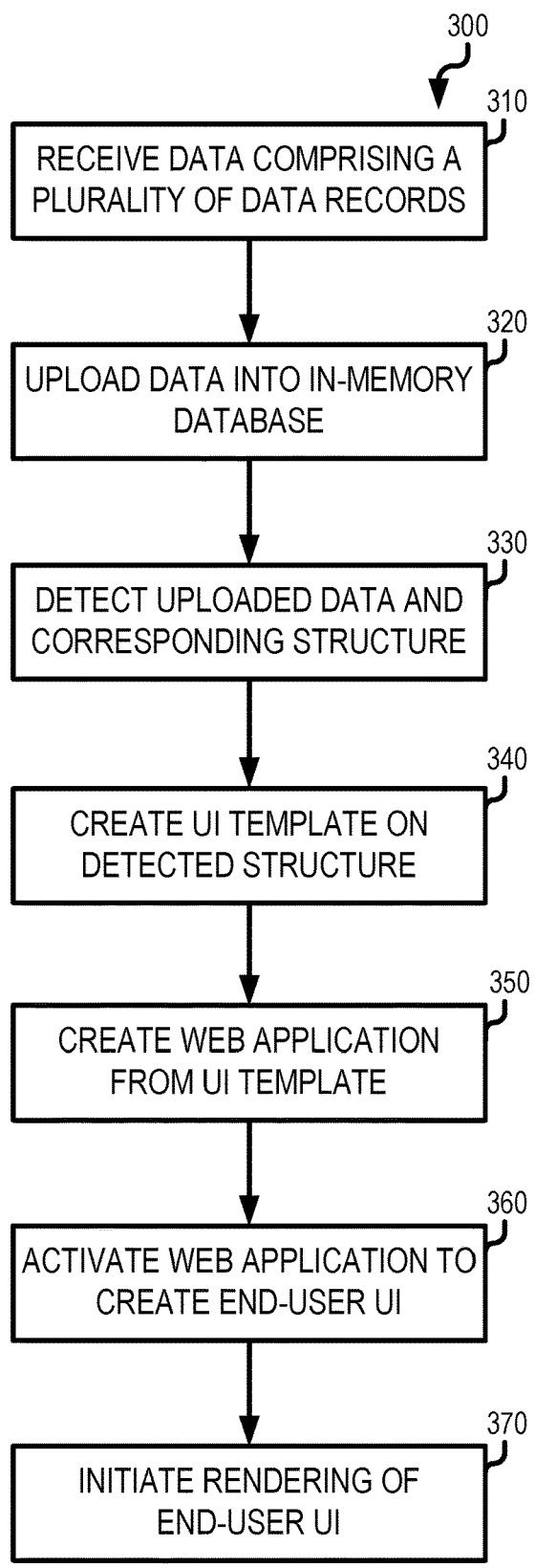
FIG. 3 is a process flow diagram illustrating the steps associated with dynamically generating a UI template and web application.

FIG. 3 is a process flow diagram 300 illustrating the steps associated with dynamically generating a UI template and web application. The web application can be HTML, HTML5, or Java-script based. Data can be received which can be comprised of a plurality of data records (block 310). The received data can be uploaded with an in-memory database (block 320) using a set of pre-defined procedures. Such a procedure can include, for example, transforming the input data stream into a table in a database schema. The input stream can be parallelized from the server end to manage variable data sizes. A plug-in embedded into the in-memory database can detect the uploaded data and a corresponding structure (block 330). A UI template can be created on the detected structure of the uploaded data (block 340). From the UI template, a web application can be created (block 350). The web application can be activated to create an end-user UI (block 360). The web application can be HTML, HTML5, or Java-script based. The end-user UI can comprise a plurality of graphical user interface elements corresponding to the uploaded data. After activation, the rendering of the end-user UI can be initiated (block 370).

Figure 4:
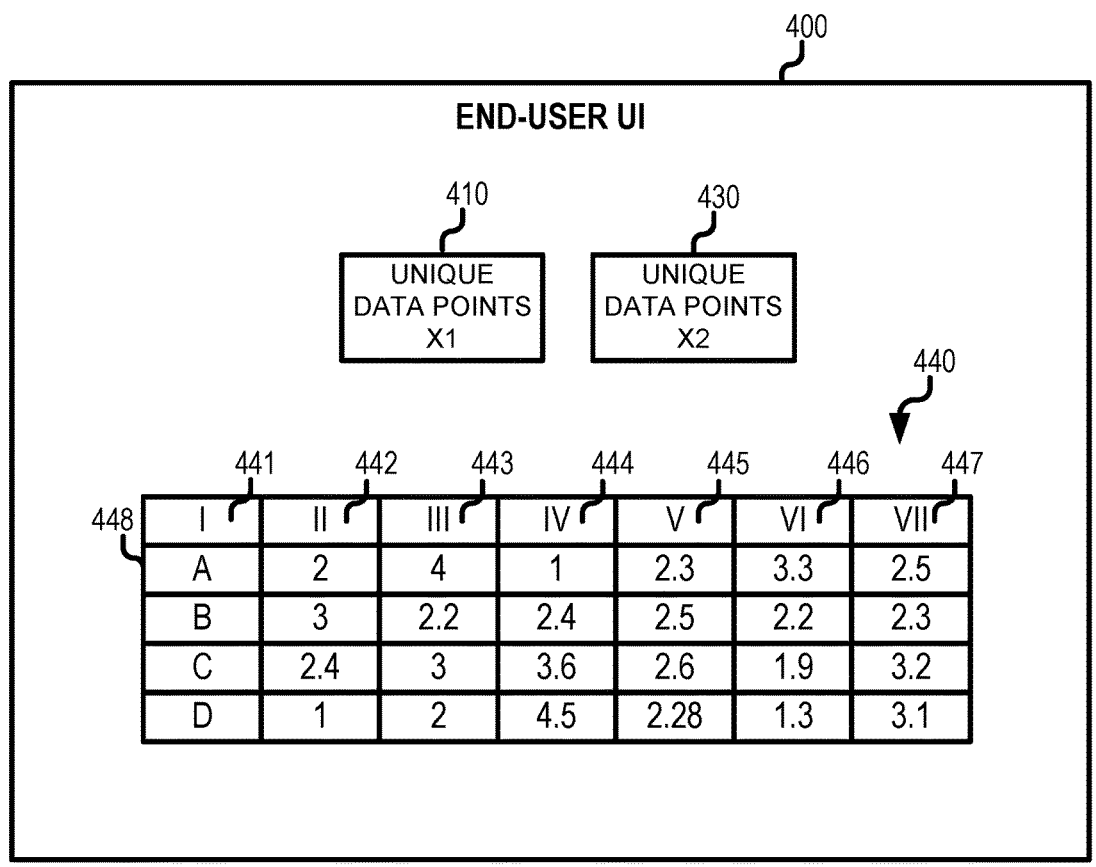
FIG. 4 is an example end-user UI.

FIG. 4 is an example end-user UI 400. End-user UI 400 can have unique data points 410, 430 and a plurality of graphical user interface elements displayed in the form of a table 440. Table 440 can include a plurality of graphical user interface elements such as graphical user interface element 448. The plurality of graphical user interface elements can correspond to columns such as columns 441, 442, 443, 444, 445, 446, 447. For example, graphical user interface element 448 belongs to column 441. Unique data points can correspond to plurality of graphical user interface elements.

An in-memory database can dynamically respond to user interactions with end-user UI 400. Modifications can be made through user interaction with the graphical user interface elements to delete, add, and/or update element information in the tables. Columns can also be ordered based on user interactions with the graphical user interface elements.

Figure 5:
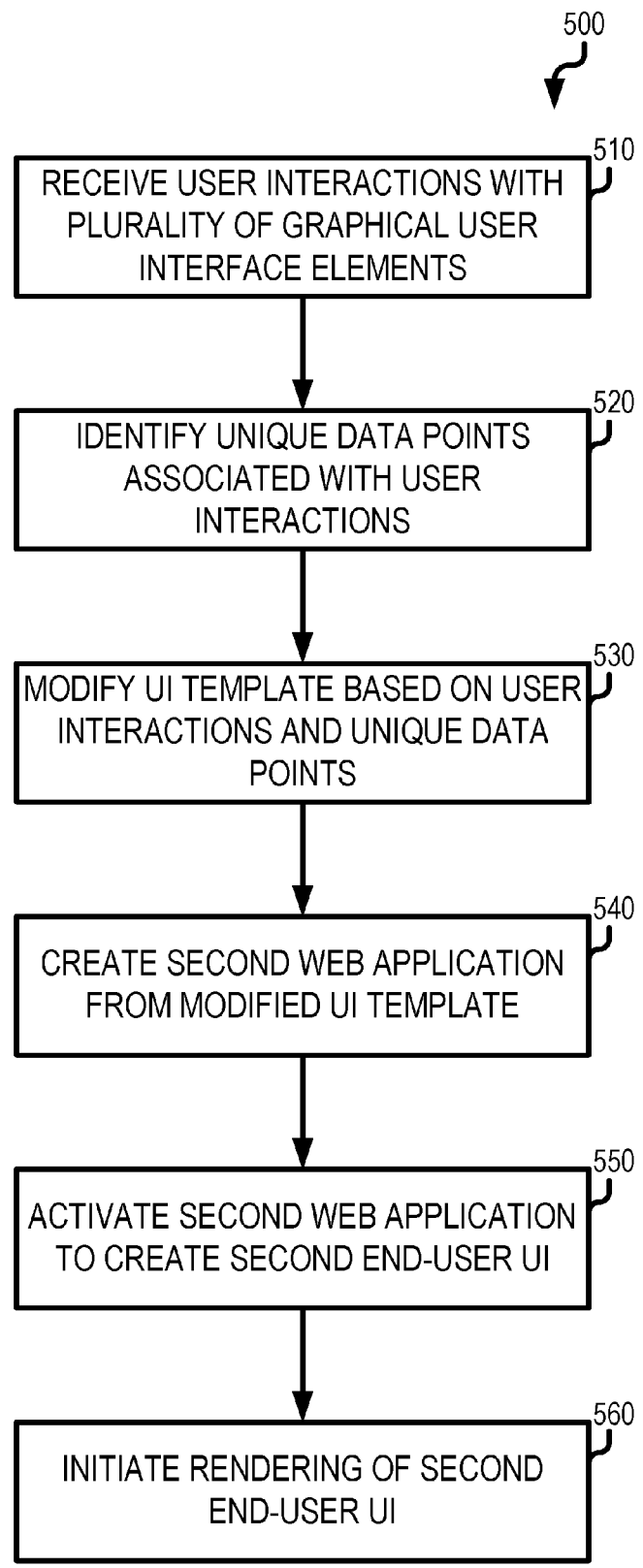
FIG. 5 is a process flow diagram illustrating the dynamic response steps associated with user interactions with the end-user UI.

FIG. 5 is a process flow diagram 500 illustrating the dynamic response steps associated with user interactions with an end-user UI. User interactions with the plurality of graphical user interface elements can be received (block 510) by one or more data processor/processor cores 130. Unique data points within the plurality of graphical user interface elements associated with the user interactions can be identified (block 520) by one or more data processor/processor cores 130. The UI template can be modified based on the user interactions and identified unique data points (block 530). A second web application can be created from the modified UI template (block 540). The second web application can be activated to create a second end-user UI (block 550). Both the second web application can be HTML, HTML5, or Java-script based. The second end-user UI can comprise a second plurality of graphical user interface elements. Rendering of the second end-user UI can be initiated (block 560) in graphical user interface 150 by one or more data processor/processor cores 130.

Figure 6:
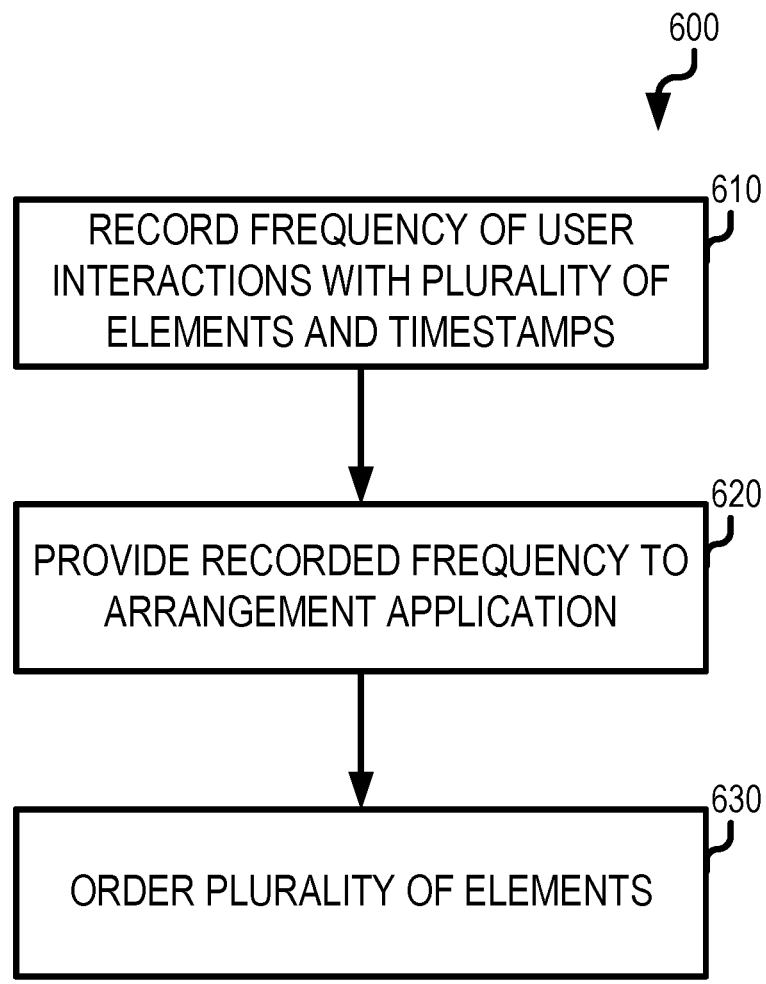
FIG. 6 is a process flow diagram illustrating steps associated with modifying the UI template based on user interactions.

FIG. 6 is a process flow diagram 600 illustrating steps associated with modifying the UI template based on user interactions. A frequency of user interactions associated with the plurality of graphical user interface elements and corresponding timestamps can be recorded (block 610) by one or more data processor/processor cores 130. The recorded frequency and time stamps can be provided to an arrangement application to generate arrangement specifications of a plurality of elements of the end-user UI (block 620). The plurality of graphical user interface elements of the end-user UI can be ordered corresponding to the arrangement specification (block 630). The arrangement specifications can enable horizontal scrolling or a panoramic view through a plurality of graphical user elements on a graphical user interface. The initiation of rendering an end-user UI in a graphical user interface can also trigger a layout rule. The layout rule can scale the end-user UI in accordance with display specifications associated with the graphical user interface.

Figure 7:
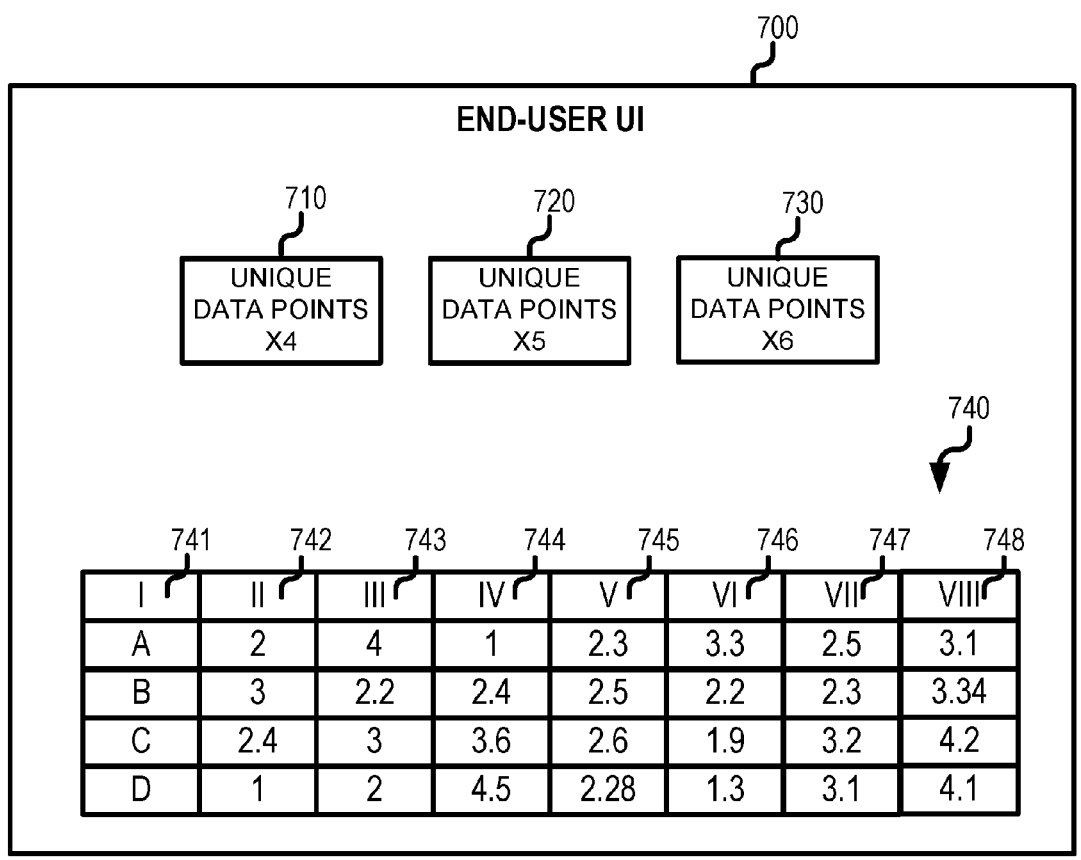
FIG. 7 is an example of an end-user UI with an added column based on user interactions with the graphical user interface elements of the end-user UI of FIG. 4.

FIG. 7 is an example of end-user UI 700 with an added column based on user interactions with the graphical user interface elements of end-user UI 400. For example, a user can add a column to table 440. Dynamically, in response to the user interaction, the UI template can be modified and a new corresponding web application can be created. Activation of the web application can create a new end-user UI, such as end-user UI 700 having table 740. Columns 441, 442, 443, 444, 445, 446, 447 can corresponds to columns 741, 742, 743, 744, 745, 746, 747, respectively, with column 748 being a user added column. New unique data points 710, 720, 730 can be identified from table 740. Columns can also be added in between existing columns as well as to the left of existing columns.

Figure 8:
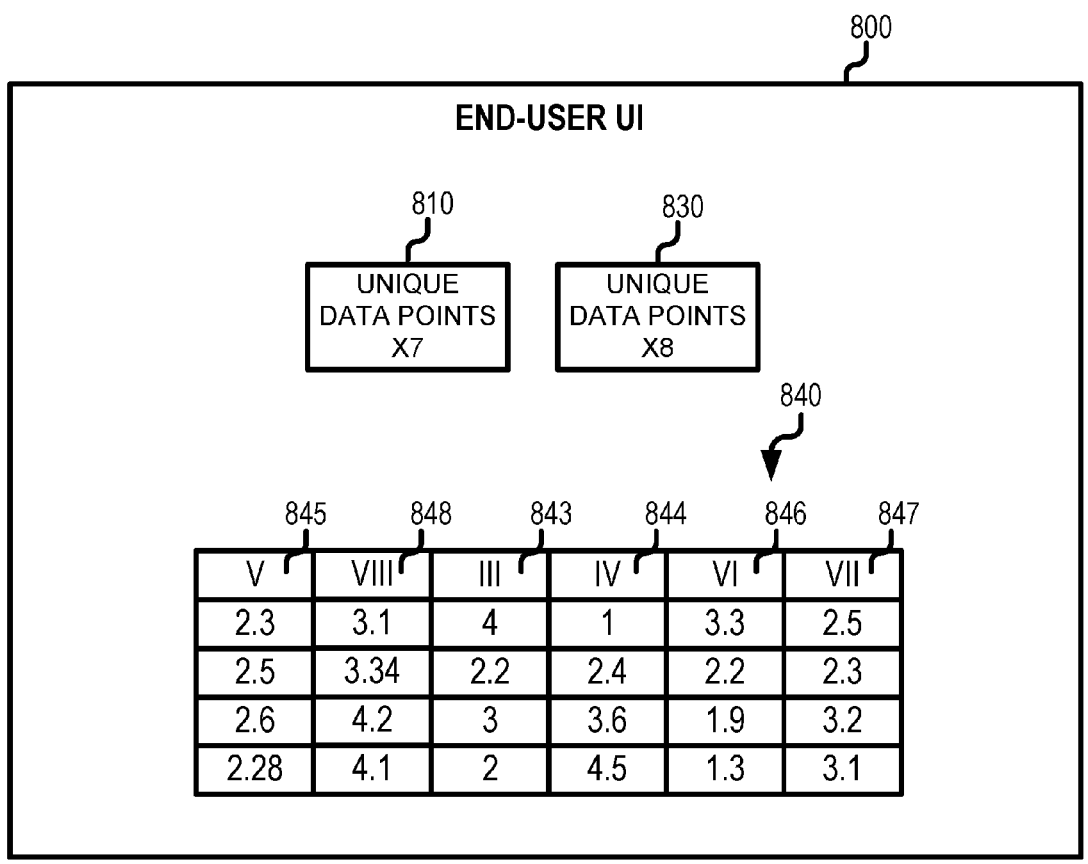
FIG. 8 is an example of an end-user UI with deleted and ordered columns based on user interactions with the graphical user interface elements of end-user UI of FIG. 7.

Columns can also be ordered and removed from a table based on user interaction with an end-user UI. FIG. 8 is an example end-user UI 800 with deleted and ordered columns based on user interactions with the graphical user interface elements of end-user UI 700. Table 840 displays modifications to a UI template with select columns deleted and other columns ordered in response to user interactions. For example, based on user interactions with end-user UI 700, columns 741, 742 can be removed from the table. As such, no columns in table 840 correspond to these removed columns.

Columns can also be ordered based on user interaction with end-user UI 700. Columns 743, 744, 745, 746, 747, 748 can be ordered to appear in a different sequential order as shown in columns 843, 844, 845, 846, 847, 848. Columns 743, 744, 745, 746, 747, 748 of table 740 correspond to columns 843, 844, 845, 846, 847, 848 of table 840, respectively. The ordering of these columns has been modified from table 740 to table 840. New unique data points 810, 830 can be identified from table 840.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A method for implementing by one or more data processors forming part of at least one computing device, the method comprising:
receiving, by at least one data processor, data comprising a plurality of data records;
uploading, by the at least one data processor, the data into an in-memory database using a set of predefined procedures;
detecting, by a plug-in embedded in the in-memory database, the uploaded data and a structure of the uploaded data;
creating, by the at least one data processor, a User Interface (UI) template on the detected structure of the uploaded data;
creating, by the at least one data processor, a web application from the UI template;
activating, by the at least one data processor, the web application to create an end-user UI, wherein the end-user UI comprises a plurality of graphical user interface elements corresponding to the uploaded data;
initiating, by at least one processor in a graphical user interface, rendering of the end-user UI in a graphical user interface;
receiving, via the at least one data processor in the graphical user interface, user interactions with the plurality of graphical user interface elements; and
identifying, by the at least one data processor, unique data points within the plurality of graphical user interface elements associated with the user interactions;
modifying, by the at least one data processor, the UI template based on the user interactions and identified unique data points;
creating, by the at least one data processor, a second web application from the modified UI template;
activating, by the at least one data processor, the second web application to create a second end-user UI, wherein the second end-user UI comprises a second plurality of graphical user interface elements; and
initiating, by the at least one data processor in the graphical user interface, rendering of the second end-user UI in the graphical user interface.

2. The method of claim 1, wherein modifying the UI template comprises:
recording, by the at least one data processor, a frequency of user interactions associated with the plurality of graphical user interface elements and corresponding timestamps;
providing, by the at least one data processor, the recorded frequency to an arrangement application to generate an arrangement specification; and
ordering, by the at least one data processor, the plurality of graphical user interface elements corresponding to the arrangement specification.

3. The method according to claim 2, wherein the arrangement specifications enable horizontal scrolling through the second plurality of elements on the graphical user interface.

4. The method according to claim 1, wherein the initiating triggers a layout rule scaling the end-user UI according to display specifications of the graphical user interface.

5. The method according to claim 1, wherein the web application is based on at least one of Hyper Text Markup Language (HTML), HTML5, or Java-script.

6. The method according to claim 1, wherein the second web application is based on at least one of HTML, HTML5, or Java-script.

7. The method of claim 1, wherein the end-user UI renders a table having a plurality of rows and columns with at least a portion of the graphical user interface elements corresponding to cells of the table.

8. The method of claim 7, wherein the modifying of the UI template comprises changing a number of rows and/or columns in the table.

9. The method of claim 8, wherein the user interactions comprise at least one of: deleting, adding, or updating element information in the table.

10. A non-transitory computer readable medium containing program instructions which, when executed by at least one data processor, result in operations comprising:
receiving data comprising a plurality of data records;
uploading the data into an in-memory database using a set of predefined procedures;
detecting, by a plug-in embedded in the in-memory database, the uploaded data and a structure of the uploaded data;
creating a User Interface (UI) template on the detected structure of the uploaded data;
creating a web application from the UI template;
activating the web application to create an end-user UI, wherein the end-user UI comprises a plurality of graphical user interface elements corresponding to the uploaded data;
initiating rendering of the end-user UI in a graphical user interface;
receiving, via the at least one data processor in the graphical user interface, user interactions with the plurality of graphical user interface elements; and
identifying, by the at least one data processor, unique data points within the plurality of graphical user interface elements associated with the user interactions;
modifying, by the at least one data processor, the UI template based on the user interactions and identified unique data points;
creating, by the at least one data processor, a second web application from the modified UI template;
activating, by the at least one data processor, the second web application to create a second end-user UI, wherein the second end-user UI comprises a second plurality of graphical user interface elements; and
initiating, by the at least one data processor in the graphical user interface, rendering of the second end-user UI in the graphical user interface.

11. The non-transitory computer readable medium of claim 10, wherein modifying the UI template comprises:
recording a frequency of user interactions associated with the plurality of graphical user interface elements and corresponding timestamps;
providing the recorded frequency to an arrangement application to generate an arrangement specification; and
ordering the plurality of graphical user interface elements corresponding to the arrangement specification.

12. The non-transitory computer readable medium of claim 11, wherein the arrangement specifications enable horizontal scrolling through the second plurality of elements on the graphical user interface.

13. The non-transitory computer readable medium of claim 10, wherein the initiating triggers a layout rule scaling the end-user UI according to display specifications of the graphical user interface.

14. The non-transitory computer readable medium of claim 10, wherein the web application is based on at least one of Hyper Text Markup Language (HTML), HTML5, or Java-script.

15. The non-transitory computer readable medium of claim 10, wherein the second web application is based on at least one of Hyper Text Markup Language (HTML), HTML5, or Java-script.

16. A system comprising:
at least one data processor;
memory-storing instructions which, when executed by the at least one data processor, result in operations comprising:
receiving data comprising a plurality of data records;
uploading the data into an in-memory database using a set of predefined procedures;
detecting, by a plug-in embedded in the in-memory database, the uploaded data and a structure of the uploaded data;
creating a User Interface (UI) template on the detected structure of the uploaded data;
creating a web application from the UI template;
activating the web application to create an end-user UI, wherein the end-user UI comprises a plurality of graphical user interface elements corresponding to the uploaded data;
initiating rendering of the end-user UI in a graphical user interface;
receiving, via the at least one data processor in the graphical user interface, user interactions with the plurality of graphical user interface elements; and
identifying, by the at least one data processor, unique data points within the plurality of graphical user interface elements associated with the user interactions;
modifying, by the at least one data processor, the UI template based on the user interactions and identified unique data points;
creating, by the at least one data processor, a second web application from the modified UI template;
activating, by the at least one data processor, the second web application to create a second end-user UI, wherein the second end-user UI comprises a second plurality of graphical user interface elements; and
initiating, by the at least one data processor in the graphical user interface, rendering of the second end-user UI in the graphical user interface.

17. The system of claim 16, wherein modifying the UI template comprises:
recording, by the at least one processor, a frequency of user interactions associated with the plurality of graphical user interface elements and corresponding timestamps;
providing, by the at least one processor, the recorded frequency to an arrangement application to generate an arrangement specification; and
ordering, by the at least one processor, the plurality of graphical user interface elements corresponding to the arrangement specification.

18. The system of claim 16, wherein the initiating triggers a layout rule scaling the end-user UI according to display specifications of the graphical user interface.

19. The system of claim 16, wherein the web application is based on at least one of Hyper Text Markup Language (HTML), HTML5, or Java-script.

20. The system of claim 16, wherein the second web application is based on at least one of HTML, HTML5, or Java-script.

* * * * *